(12) United States Patent
Thorstensen-Woll et al.

(10) Patent No.: US 11,708,198 B2
(45) Date of Patent: Jul. 25, 2023

(54) GRIP ENHANCEMENTS FOR TABBED SEAL

(71) Applicant: Selig Sealing Products, Inc., Forrest, IL (US)

(72) Inventors: Robert William Thorstensen-Woll, Barrie (CA); Steven A. Brucker, Gibson City, IL (US)

(73) Assignee: Selig Sealing Products, Inc., Forrest, IL (US)

( * ) Notice: Subject to any disclaimer, the term of this patent is extended or adjusted under 35 U.S.C. 154(b) by 69 days.

(21) Appl. No.: 17/258,395

(22) PCT Filed: Jul. 9, 2019

(86) PCT No.: PCT/US2019/041052
§ 371 (c)(1),
(2) Date: Jan. 6, 2021

(87) PCT Pub. No.: WO2020/014262
PCT Pub. Date: Jan. 16, 2020

(65) Prior Publication Data
US 2021/0292060 A1    Sep. 23, 2021

Related U.S. Application Data

(60) Provisional application No. 62/695,277, filed on Jul. 9, 2018.

(51) Int. Cl.
*B65D 51/20*    (2006.01)

(52) U.S. Cl.
CPC ........ *B65D 51/20* (2013.01); *B65D 2251/009* (2013.01); *B65D 2251/0093* (2013.01); *B65D 2577/205* (2013.01)

(58) Field of Classification Search
CPC .............. B65D 51/20; B65D 2251/009; B65D 2251/0093; B65D 2577/205;
(Continued)

(56) References Cited

U.S. PATENT DOCUMENTS 1,818,379 A    8/1931    Cain
2,768,762 A   10/1956    Guinet
(Continued)

FOREIGN PATENT DOCUMENTS

AT    501393 A1    8/2006
AT    11738 U1    4/2011
(Continued)

OTHER PUBLICATIONS

Patent Cooperation Treaty, International Search Report and Written Opinion of the International Searching Authority for International Application No. PCT/US2019/041052 dated Sep. 26, 2019, 14 pages.

*Primary Examiner* — Jennifer Robertson
*Assistant Examiner* — John Martin Hoppmann
(74) *Attorney, Agent, or Firm* — Fitch, Even, Tabin & Flannery, LLP

(57) ABSTRACT

Various enhancements of tabbed seals are provided herein with enhanced grasping functionality. Such enhancements include an anti-slip coating, a polymer adhesive layer, embossing, increasing the thickness of the tab, and/or increasing the overall surface area of the tab.

13 Claims, 8 Drawing Sheets

(58) Field of Classification Search
CPC .............. B65D 2251/0015; B65D 1/20; B65D 1/0238; B65D 55/026; B65D 77/2032; B65D 77/204; B65D 77/2024; B65D 77/2044; B65D 2577/2041; B65D 2517/0013; G09F 3/04
USPC ....... 215/232, 347, 258, 348, 250, 305, 364, 215/349, 295; 220/270, 258.2, 0.3, 359.2, 220/359.4, 359.1, 259.2–259.3; 428/354, 428/35.7, 35.9, 66.3
See application file for complete search history.

(56) References Cited

U.S. PATENT DOCUMENTS

| | | |
|---|---|---|
| 3,235,165 A | 2/1966 | Jackson |
| 3,292,828 A | 12/1966 | Stuart |
| 3,302,818 A | 2/1967 | Balocca et al. |
| 3,460,310 A | 8/1969 | Adcock et al. |
| 3,556,816 A | 1/1971 | Nughes |
| 3,964,670 A | 6/1976 | Amneus |
| 3,990,603 A | 11/1976 | Brochman |
| 4,133,796 A | 1/1979 | Bullman |
| 4,206,165 A | 6/1980 | Dukess |
| 4,266,687 A | 5/1981 | Cummings |
| 4,396,655 A | 8/1983 | Graham |
| 4,556,590 A | 12/1985 | Martin |
| 4,582,735 A | 4/1986 | Smith |
| 4,588,099 A | 5/1986 | Diez |
| 4,595,116 A | 6/1986 | Carlsson |
| 4,596,338 A | 6/1986 | Yousif |
| 4,636,273 A | 1/1987 | Wolfersperger |
| 4,666,052 A | 5/1987 | Ou-Yang |
| 4,693,390 A | 9/1987 | Hekal |
| 4,735,335 A | 4/1988 | Torterotot |
| 4,741,791 A | 5/1988 | Howard |
| 4,762,246 A | 8/1988 | Ashley |
| 4,770,325 A | 9/1988 | Gordon |
| 4,771,903 A | 9/1988 | Levene |
| 4,781,294 A | 11/1988 | Croce |
| 4,801,647 A | 1/1989 | Wolfe, Jr. |
| 4,811,856 A | 3/1989 | Fischman |
| 4,818,577 A | 4/1989 | Ou-Yang |
| 4,837,061 A | 6/1989 | Smits |
| 4,863,061 A | 9/1989 | Moore |
| 4,867,881 A | 9/1989 | Kinzer |
| 4,889,731 A | 12/1989 | Williams |
| 4,917,949 A | 4/1990 | Yousif |
| 4,934,544 A | 6/1990 | Han |
| 4,938,390 A | 7/1990 | Markva |
| 4,960,216 A | 10/1990 | Giles |
| 4,961,986 A | 10/1990 | Galda |
| 5,004,111 A * | 4/1991 | McCarthy .............. B65D 51/20 220/359.3 |
| 5,012,946 A | 5/1991 | McCarthy |
| 5,015,318 A | 5/1991 | Smits |
| 5,053,457 A | 10/1991 | Lee |
| 5,055,150 A | 10/1991 | Rosenfeld |
| 5,057,365 A | 10/1991 | Finkelstein |
| 5,071,710 A | 12/1991 | Smits |
| 5,089,320 A | 2/1992 | Straus |
| 5,098,495 A | 3/1992 | Smits |
| RE33,893 E | 4/1992 | Elias |
| 5,106,124 A | 4/1992 | Volkman |
| 5,125,529 A | 6/1992 | Torterotot |
| 5,131,556 A | 7/1992 | Iioka |
| 5,149,386 A | 9/1992 | Smits |
| 5,178,967 A | 1/1993 | Rosenfeld |
| 5,197,618 A | 3/1993 | Goth |
| 5,217,790 A | 6/1993 | Galda |
| 5,226,281 A | 7/1993 | Han |
| 5,261,990 A | 11/1993 | Galda |
| 5,265,745 A | 11/1993 | Pereyra |
| 5,433,992 A | 7/1995 | Galda |
| 5,513,781 A | 5/1996 | Ullrich |
| 5,514,442 A | 5/1996 | Galda |
| 5,560,989 A | 10/1996 | Han |
| 5,598,940 A | 2/1997 | Finkelstein |
| 5,601,200 A | 2/1997 | Finkelstein |
| 5,615,789 A | 4/1997 | Finkelstein |
| 5,618,618 A | 4/1997 | Murschall |
| 5,669,521 A | 9/1997 | Wiening |
| 5,683,774 A | 11/1997 | Faykish |
| 5,702,015 A * | 12/1997 | Giles ...................... B65D 51/20 215/349 |
| 5,709,310 A | 1/1998 | Kretz |
| 5,776,284 A | 7/1998 | Sykes |
| 5,851,333 A | 12/1998 | Fagnant |
| 5,860,544 A | 1/1999 | Brucker |
| 5,871,112 A | 2/1999 | Giles |
| 5,887,747 A | 3/1999 | Burklin |
| 5,915,577 A | 6/1999 | Levine |
| 5,975,304 A | 11/1999 | Cain |
| 5,976,294 A | 11/1999 | Fagnant |
| 6,056,141 A | 5/2000 | Navarini |
| 6,082,566 A | 7/2000 | Yousif |
| 6,096,358 A | 8/2000 | Murdick |
| 6,131,754 A | 10/2000 | Smelko |
| 6,139,931 A | 10/2000 | Finkelstein |
| 6,158,632 A | 12/2000 | Ekkert |
| 6,194,042 B1 | 2/2001 | Finkelstein |
| 6,234,386 B1 | 5/2001 | Drummond |
| 6,290,801 B1 | 9/2001 | Krampe |
| 6,312,776 B1 | 11/2001 | Finkelstein |
| 6,361,856 B1 | 3/2002 | Wakai |
| 6,378,715 B1 | 4/2002 | Finkelstein |
| 6,458,302 B1 | 10/2002 | Shifflet |
| 6,461,714 B1 | 10/2002 | Giles |
| 6,544,615 B2 | 4/2003 | Otten |
| 6,548,302 B1 | 4/2003 | Mao |
| 6,602,309 B2 | 8/2003 | Vizulis |
| 6,627,273 B2 | 9/2003 | Wolf |
| 6,635,137 B2 | 10/2003 | Giles |
| 6,669,046 B1 | 12/2003 | Sawada |
| 6,699,566 B2 | 3/2004 | Zeiter |
| 6,705,467 B1 | 3/2004 | Kancsar |
| 6,722,272 B2 | 4/2004 | Jud |
| 6,767,425 B2 | 7/2004 | Meier |
| 6,790,508 B2 | 9/2004 | Razeti |
| 6,866,926 B1 | 3/2005 | Smelko |
| 6,902,075 B2 | 6/2005 | Obrien |
| 6,916,516 B1 | 7/2005 | Gerber |
| 6,955,736 B2 | 10/2005 | Rosenberger |
| 6,959,832 B1 | 11/2005 | Sawada |
| 6,974,045 B1 | 12/2005 | Trombach |
| 6,986,930 B2 | 1/2006 | Giles |
| 7,128,210 B2 | 10/2006 | Razeti |
| 7,182,475 B2 | 2/2007 | Kramer |
| 7,217,454 B2 | 5/2007 | Smelko |
| RE39,790 E | 8/2007 | Fuchs |
| 7,316,760 B2 | 1/2008 | Nageli |
| 7,448,153 B2 | 11/2008 | Maliner |
| 7,531,228 B2 | 5/2009 | Perre |
| 7,648,764 B2 | 1/2010 | Yousif |
| 7,713,605 B2 | 5/2010 | Yousif |
| 7,731,048 B2 | 6/2010 | Teixeira Alvares |
| 7,740,730 B2 | 6/2010 | Schedl |
| 7,740,927 B2 | 6/2010 | Yousif |
| 7,757,879 B2 | 7/2010 | Schuetz |
| 7,789,262 B2 | 9/2010 | Niederer |
| 7,798,359 B1 | 9/2010 | Marsella |
| 7,819,266 B2 | 10/2010 | Ross |
| 7,838,109 B2 | 11/2010 | Declerck |
| 7,850,033 B2 | 12/2010 | Thorstensen-Woll |
| 8,025,171 B2 | 9/2011 | Cassol |
| 8,057,896 B2 | 11/2011 | Smelko |
| 8,129,009 B2 | 3/2012 | Morris |
| 8,201,385 B2 | 6/2012 | McLean |
| 8,308,003 B2 | 11/2012 | O'Brien |
| 8,329,288 B2 | 12/2012 | Allegaert |
| 8,348,082 B2 | 1/2013 | Cain |
| 8,455,071 B2 * | 6/2013 | Lo .......................... B65D 51/22 428/36.5 |
| 8,541,081 B1 | 9/2013 | Ranganathan |
| 8,703,265 B2 | 4/2014 | Thorstensen-Woll |

(56) References Cited

U.S. PATENT DOCUMENTS

| | | | |
|---|---|---|---|
| 8,715,825 B2 | 5/2014 | Thorstensen-Woll | |
| 8,852,725 B2 * | 10/2014 | Sachs | B65D 51/20 156/364 |
| 8,906,185 B2 | 12/2014 | McLean | |
| 8,944,264 B2 | 2/2015 | Frishman | |
| 9,028,963 B2 | 5/2015 | Thorstensen-Woll | |
| 9,102,438 B2 | 8/2015 | Thorstensen-Woll | |
| 9,193,513 B2 | 11/2015 | Thorstensen-Woll | |
| 9,221,579 B2 | 12/2015 | Thorstensen-Woll | |
| 9,227,755 B2 | 1/2016 | Thorstensen-Woll | |
| 9,278,506 B2 | 3/2016 | McLean | |
| 9,278,793 B2 | 3/2016 | Thorstensen-Woll | |
| 9,440,765 B2 | 9/2016 | Thorstensen-Woll | |
| 9,440,768 B2 | 9/2016 | Thorstensen-Woll | |
| 9,533,805 B2 | 1/2017 | McLean | |
| 9,676,513 B2 | 6/2017 | Thorstensen-Woll | |
| 9,834,339 B2 | 12/2017 | Brucker | |
| 9,956,741 B2 | 5/2018 | Planchard | |
| 9,994,357 B2 | 6/2018 | Thorstensen-Woll | |
| 10,000,310 B2 | 6/2018 | Thorstensen-Woll | |
| 10,150,590 B2 | 12/2018 | Thorstensen-Woll | |
| 10,196,174 B2 | 2/2019 | Thorstensen-Woll | |
| 10,259,626 B2 | 4/2019 | Thorstensen-Woll | |
| 10,556,732 B2 | 2/2020 | Cassidy | |
| 10,604,315 B2 | 3/2020 | Thorstensen-Woll | |
| 10,899,506 B2 | 1/2021 | Thorstensen-Woll | |
| 10,934,069 B2 | 3/2021 | Clark | |
| 10,954,032 B2 | 3/2021 | Thorstensen-Woll | |
| 11,059,644 B2 | 7/2021 | Cassidy | |
| 2001/0023870 A1 | 9/2001 | Mihalov | |
| 2001/0031348 A1 | 10/2001 | Jud | |
| 2002/0028326 A1 | 3/2002 | Lhila | |
| 2002/0068140 A1 | 6/2002 | Finkelstein | |
| 2003/0087057 A1 | 5/2003 | Blemberg | |
| 2003/0108714 A1 | 6/2003 | Razeti | |
| 2003/0168423 A1 | 9/2003 | Williams | |
| 2003/0196418 A1 | 10/2003 | O'Brien | |
| 2004/0013862 A1 | 1/2004 | Brebion | |
| 2004/0028851 A1 | 2/2004 | Okhai | |
| 2004/0043165 A1 | 3/2004 | Van Hulle | |
| 2004/0043238 A1 | 3/2004 | Wuest | |
| 2004/0109963 A1 | 6/2004 | Zaggia | |
| 2004/0197500 A9 * | 10/2004 | Swoboda | B65D 81/3446 428/143 |
| 2004/0211320 A1 | 10/2004 | Cain | |
| 2005/0003155 A1 | 1/2005 | Huffer | |
| 2005/0048307 A1 | 3/2005 | Schubert | |
| 2005/0100718 A1 | 5/2005 | Peiffer | |
| 2005/0208242 A1 | 9/2005 | Smelko | |
| 2005/0208244 A1 | 9/2005 | Delmas | |
| 2005/0218143 A1 | 10/2005 | Niederer | |
| 2005/0279814 A1 | 12/2005 | Drummond | |
| 2006/0000545 A1 | 1/2006 | Nageli | |
| 2006/0003120 A1 | 1/2006 | Nageli | |
| 2006/0003122 A1 | 1/2006 | Nageli | |
| 2006/0068163 A1 | 3/2006 | Giles | |
| 2006/0124577 A1 | 6/2006 | Ross | |
| 2006/0151415 A1 | 7/2006 | Smelko | |
| 2006/0278665 A1 | 12/2006 | Bennett | |
| 2007/0003725 A1 | 1/2007 | Yousif | |
| 2007/0007229 A1 | 1/2007 | Yousif | |
| 2007/0014897 A1 | 1/2007 | Ramesh | |
| 2007/0065609 A1 | 3/2007 | Korson | |
| 2007/0267304 A1 | 11/2007 | Portier | |
| 2007/0298273 A1 | 12/2007 | Thies | |
| 2008/0026171 A1 | 1/2008 | Gullick | |
| 2008/0073308 A1 | 3/2008 | Yousif | |
| 2008/0103262 A1 | 5/2008 | Haschke | |
| 2008/0135159 A1 | 6/2008 | Bries | |
| 2008/0145581 A1 | 6/2008 | Tanny | |
| 2008/0156443 A1 | 7/2008 | Schaefer | |
| 2008/0169286 A1 | 7/2008 | McLean | |
| 2008/0231922 A1 | 9/2008 | Thorstensen-Woll | |
| 2008/0233339 A1 | 9/2008 | Thorstensen-Woll | |
| 2008/0233424 A1 | 9/2008 | Thorstensen-Woll | |
| 2009/0078671 A1 | 3/2009 | Triquet | |
| 2009/0208729 A1 | 8/2009 | Allegaert | |
| 2009/0304964 A1 | 12/2009 | Sachs | |
| 2010/0009162 A1 | 1/2010 | Rothweiler | |
| 2010/0030180 A1 | 2/2010 | Deckerck | |
| 2010/0047552 A1 | 2/2010 | McLean | |
| 2010/0059942 A1 | 3/2010 | Rothweiler | |
| 2010/0116410 A1 | 5/2010 | Yousif | |
| 2010/0155288 A1 | 6/2010 | Harper | |
| 2010/0170820 A1 | 7/2010 | Leplatois | |
| 2010/0193463 A1 * | 8/2010 | O'Brien | B32B 27/065 156/60 |
| 2010/0213193 A1 | 8/2010 | Helmlinger | |
| 2010/0221483 A1 | 9/2010 | Gonzalez Carro | |
| 2010/0279041 A1 | 11/2010 | Mathew | |
| 2010/0290663 A1 | 11/2010 | Trassl | |
| 2010/0314278 A1 | 12/2010 | Fonteyne | |
| 2011/0000917 A1 | 1/2011 | Wolters | |
| 2011/0005961 A1 | 1/2011 | Leplatois | |
| 2011/0089177 A1 | 4/2011 | Thorstensen-Woll | |
| 2011/0091715 A1 | 4/2011 | Rakutt | |
| 2011/0100949 A1 | 5/2011 | Grayer | |
| 2011/0100989 A1 | 5/2011 | Cain | |
| 2011/0138742 A1 | 6/2011 | McLean | |
| 2011/0147353 A1 | 6/2011 | Kornfeld | |
| 2011/0152821 A1 | 6/2011 | Kornfeld | |
| 2012/0000910 A1 | 1/2012 | Ekkert | |
| 2012/0043330 A1 * | 2/2012 | McLean | B32B 27/08 220/359.2 |
| 2012/0067896 A1 | 3/2012 | Daffner | |
| 2012/0070636 A1 | 3/2012 | Thorstensen-Woll | |
| 2012/0103988 A1 | 5/2012 | Wiening | |
| 2012/0111758 A1 | 5/2012 | Lo | |
| 2012/0241449 A1 | 9/2012 | Frischmann | |
| 2012/0285920 A1 | 11/2012 | McLean | |
| 2012/0288693 A1 | 11/2012 | Stanley | |
| 2012/0312818 A1 | 12/2012 | Ekkert | |
| 2013/0020324 A1 | 1/2013 | Thorstensen-Woll | |
| 2013/0020328 A1 | 1/2013 | Duan | |
| 2013/0045376 A1 | 2/2013 | Chen | |
| 2013/0121623 A1 | 5/2013 | Lyzenga | |
| 2013/0177263 A1 | 7/2013 | Duan | |
| 2013/0248410 A9 | 9/2013 | Spallek | |
| 2014/0001185 A1 | 1/2014 | McLean | |
| 2014/0061196 A1 | 3/2014 | Thorstensen-Woll | |
| 2014/0061197 A1 * | 3/2014 | Thorstensen-Woll | B32B 27/34 220/359.2 |
| 2014/0186589 A1 | 7/2014 | Chang | |
| 2014/0224800 A1 * | 8/2014 | Thorstensen-Woll | G03H 1/0244 220/255 |
| 2014/0284331 A1 | 9/2014 | Thorstensen-Woll | |
| 2014/0326727 A1 | 11/2014 | Jouin | |
| 2015/0053680 A1 | 2/2015 | Masato | |
| 2015/0131926 A1 | 5/2015 | Lux | |
| 2015/0158643 A1 | 6/2015 | Coker | |
| 2015/0197385 A1 | 7/2015 | Wei | |
| 2015/0225116 A1 | 8/2015 | Thorstensen-Woll | |
| 2015/0321808 A1 | 11/2015 | Thorstensen-Woll | |
| 2016/0001952 A1 | 1/2016 | Kulkarni | |
| 2016/0159546 A1 | 6/2016 | Cassidy | |
| 2016/0185485 A1 | 6/2016 | Thorstensen-Woll | |
| 2016/0325896 A1 | 11/2016 | Thorstensen-Woll | |
| 2017/0173930 A1 | 6/2017 | McLean | |
| 2017/0253373 A1 | 9/2017 | Thorstensen-Woll | |
| 2017/0259978 A1 | 9/2017 | Zamora | |
| 2017/0291399 A1 * | 10/2017 | Bourgeois | B29C 65/7461 |
| 2018/0079576 A1 | 3/2018 | Cassidy | |
| 2018/0118439 A1 | 5/2018 | Thorstensen-Woll | |
| 2018/0186122 A1 | 7/2018 | Bourgeois | |
| 2019/0055070 A1 | 2/2019 | Brown | |
| 2019/0092520 A1 | 3/2019 | Thorstensen-Woll | |
| 2019/0225369 A1 | 7/2019 | Thorstensen-Woll | |
| 2019/0276209 A1 | 9/2019 | Clark | |
| 2020/0079561 A1 | 3/2020 | Zamora | |
| 2020/0087056 A1 | 3/2020 | Bosetti | |
| 2020/0216256 A1 | 7/2020 | Miozzo | |
| 2020/0282708 A1 | 9/2020 | Leuer | |

(56) References Cited

U.S. PATENT DOCUMENTS

| | | |
|---|---|---|
| 2021/0188489 A1 | 6/2021 | Thorstensen-Woll |
| 2021/0237951 A1 | 8/2021 | Ostergren |
| 2021/0292059 A1 | 9/2021 | Thorstensen-Woll |

FOREIGN PATENT DOCUMENTS

| | | | |
|---|---|---|---|
| BR | 8200231 | U | 9/2003 |
| BR | 0300992 | A | 11/2004 |
| CA | 2015992 | A1 | 1/1991 |
| CA | 2203744 | A1 | 10/1997 |
| CA | 2297840 | A1 | 2/1999 |
| CN | 1301289 | A | 6/2001 |
| CN | 1639020 | A | 7/2005 |
| CN | 103193026 | A | 7/2013 |
| CN | 104853994 | A | 8/2015 |
| DE | 102006030118 | B3 | 5/2007 |
| DE | 10204281 | A1 | 8/2007 |
| DE | 102007022935 | B4 | 4/2009 |
| DE | 202009000245 | U1 | 4/2009 |
| EP | 0135431 | A1 | 3/1985 |
| EP | 0577432 | A1 | 1/1994 |
| EP | 0668221 | A1 | 8/1995 |
| EP | 0826598 | A2 | 3/1998 |
| EP | 0826599 | A2 | 3/1998 |
| EP | 0905039 | A1 | 3/1999 |
| EP | 0717710 | B1 | 4/1999 |
| EP | 0915026 | A1 | 5/1999 |
| EP | 0706473 | B1 | 8/1999 |
| EP | 1075921 | A2 | 2/2001 |
| EP | 1199253 | A2 | 4/2002 |
| EP | 0803445 | B1 | 11/2003 |
| EP | 1462381 | A1 | 9/2004 |
| EP | 1199253 | B1 | 3/2005 |
| EP | 1577226 | A1 | 9/2005 |
| EP | 1814744 | A1 | 8/2007 |
| EP | 1834893 | A1 | 9/2007 |
| EP | 1837288 | A1 | 9/2007 |
| EP | 1839898 | A1 | 10/2007 |
| EP | 1839899 | A1 | 10/2007 |
| EP | 1857275 | A1 | 11/2007 |
| EP | 1873078 | A1 | 1/2008 |
| EP | 1445209 | B1 | 5/2008 |
| EP | 1918094 | A1 | 5/2008 |
| EP | 1935636 | A1 | 6/2008 |
| EP | 1968020 | A1 | 9/2008 |
| EP | 1992476 | A1 | 11/2008 |
| EP | 2014461 | A1 | 1/2009 |
| EP | 2230190 | A1 | 9/2010 |
| EP | 2292524 | A1 | 3/2011 |
| EP | 2599735 | A1 | 6/2013 |
| EP | 2230190 | B1 | 8/2014 |
| EP | 3278972 | B1 | 10/2020 |
| FR | 2693986 | A1 | 1/1994 |
| FR | 2916157 | A1 | 11/2008 |
| FR | 2943322 | A1 | 9/2010 |
| GB | 1216991 | A | 12/1970 |
| GB | 2353986 | A | 3/2001 |
| GB | 2501967 | A | 11/2013 |
| JP | H09110077 | A | 4/1997 |
| JP | 2004212778 | A | 7/2004 |
| JP | 2014015249 | | 1/2014 |
| JP | 2014015249 | A * | 1/2014 |
| KR | 100711073 | B1 | 4/2007 |
| KR | 100840926 | B1 | 6/2008 |
| KR | 100886955 | B1 | 3/2009 |
| MX | 05002905 | A | 2/2006 |
| MX | 2010001867 | A | 4/2010 |
| TW | 201217237 | A | 5/2012 |
| WO | 9702997 | A1 | 1/1997 |
| WO | 9905041 | A1 | 2/1999 |
| WO | 0066450 | A1 | 11/2000 |
| WO | 2005009868 | A1 | 2/2005 |
| WO | 2005030860 | A1 | 4/2005 |
| WO | 2006018556 | A1 | 2/2006 |
| WO | 2006021291 | A1 | 3/2006 |
| WO | 2006073777 | A1 | 7/2006 |
| WO | 2006108853 | A1 | 10/2006 |
| WO | 2008027029 | A2 | 3/2008 |
| WO | 2008027036 | A1 | 3/2008 |
| WO | 2008039350 | A2 | 4/2008 |
| WO | 2008113855 | A1 | 9/2008 |
| WO | 2008118569 | A2 | 10/2008 |
| WO | 2008125784 | A1 | 10/2008 |
| WO | 2008125785 | A1 | 10/2008 |
| WO | 2008148176 | A1 | 12/2008 |
| WO | 2009092066 | A2 | 7/2009 |
| WO | 2010115811 | A1 | 10/2010 |
| WO | 2011039067 | A1 | 4/2011 |
| WO | 2012079971 | A1 | 6/2012 |
| WO | 2012113530 | A1 | 8/2012 |
| WO | 2012152622 | A1 | 11/2012 |
| WO | 2012172029 | A1 | 12/2012 |
| WO | 2013134665 | A1 | 9/2013 |
| WO | 2014190395 | A1 | 12/2014 |
| WO | 2015119988 | A1 | 8/2015 |
| WO | 2016203251 | A1 | 12/2016 |
| WO | 2017155946 | A1 | 9/2017 |
| WO | 2018081419 | | 5/2018 |

* cited by examiner

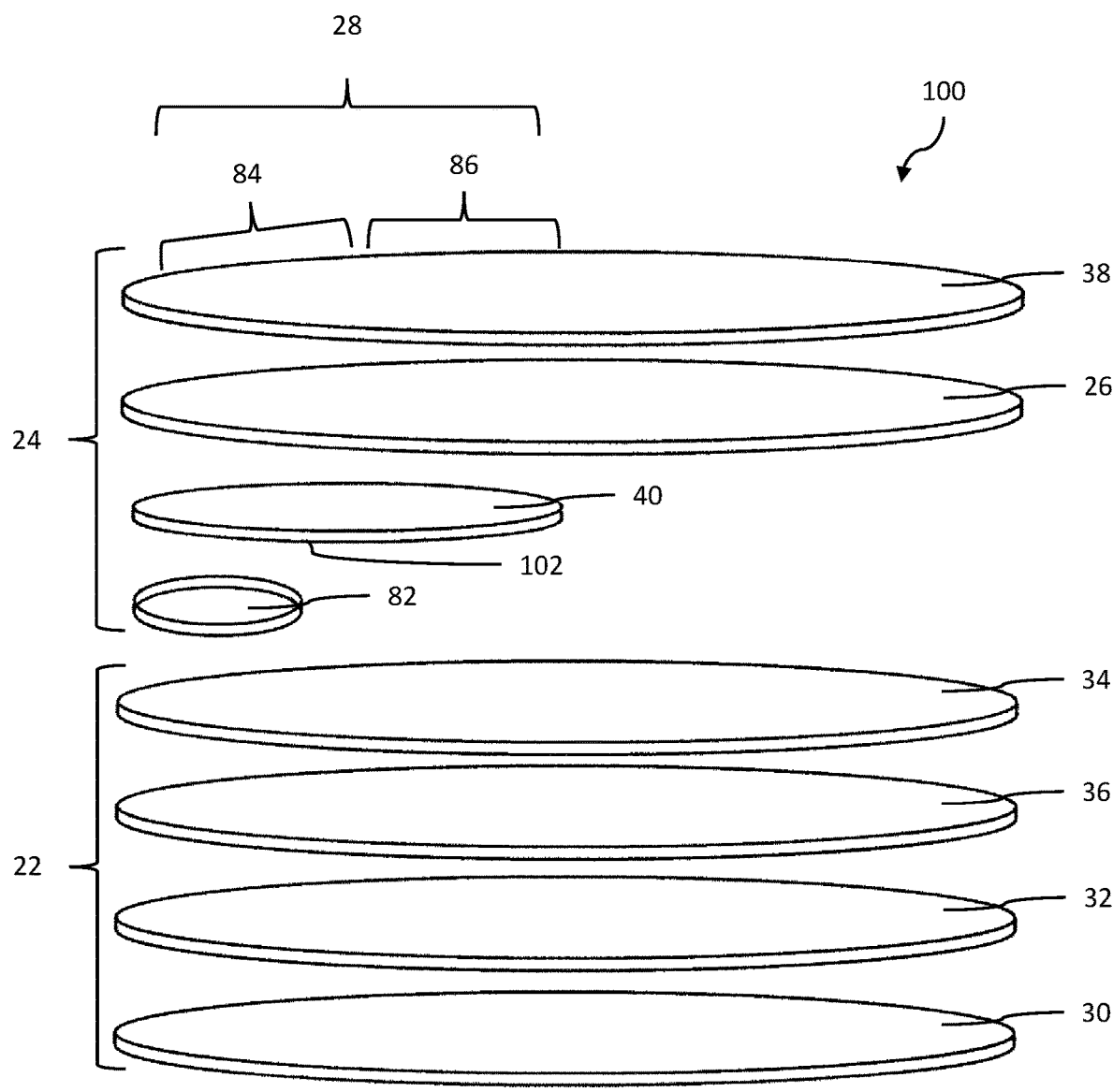

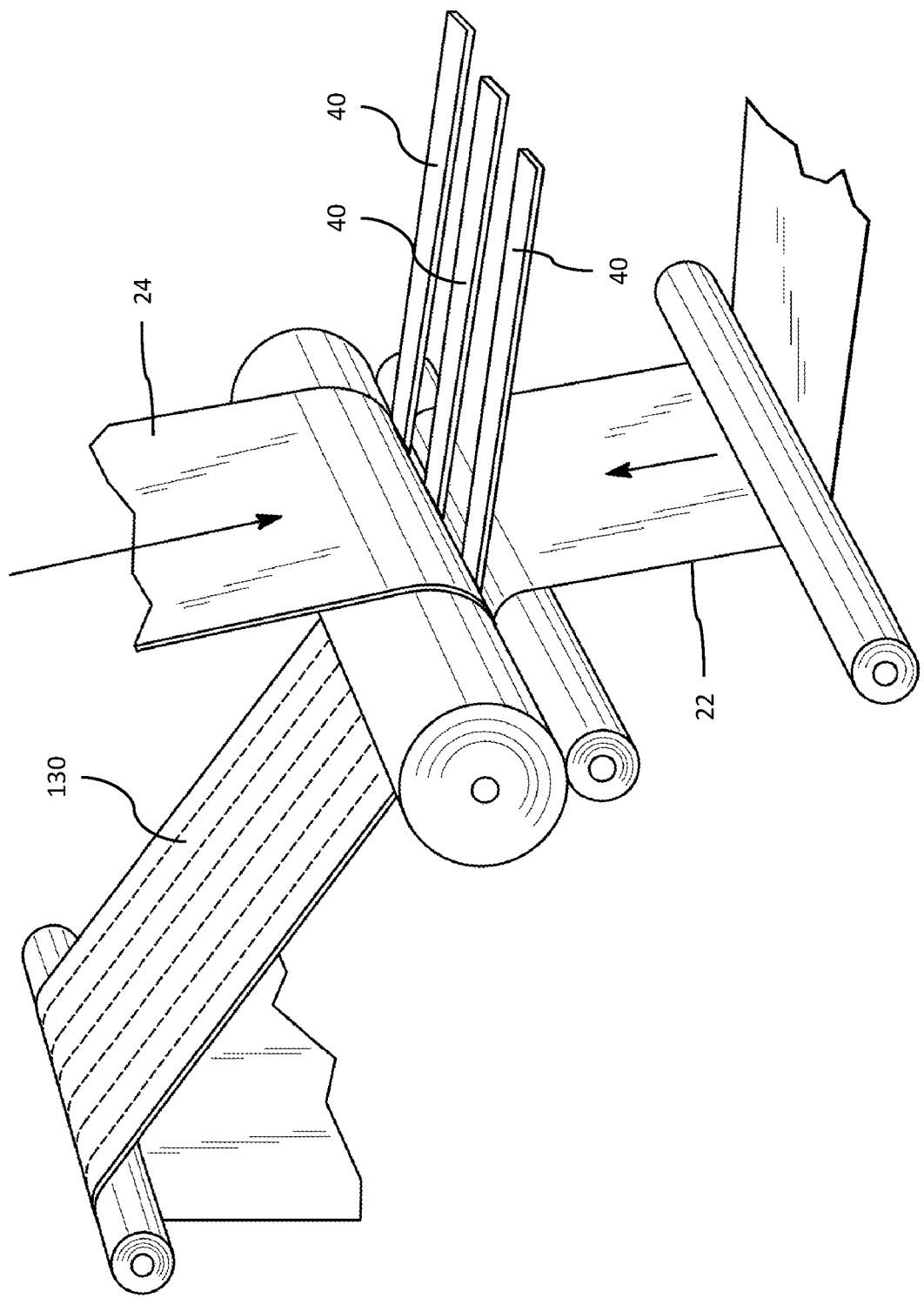

GRIP ENHANCEMENTS FOR TABBED SEAL

CROSS-REFERENCE TO RELATED APPLICATIONS

This application is a U.S. national phase application filed under 35 U.S.C. § 371 of International Application Number PCT/US2019/041052, filed Jul. 9, 2019, designating the United States which claims benefit of U.S. Provisional Application No. 62/695,277, filed Jul. 9, 2018, which is hereby incorporated herein by reference in its entirety.

FIELD OF THE INVENTION

The disclosure relates to pull-tab sealing members for sealing the mouth of a container, and more particularly, to pull-tab sealing members having a tab with enhanced gripping functionality.

BACKGROUND OF THE INVENTION

It is often desirable to seal the opening of a container using a removable or peelable seal, sealing member, or inner seal. Often a cap or other closure is then screwed or placed over the container opening capturing the sealing member therein. In use, a consumer typically removes the cap or other closure to gain access to the sealing member and then removes or otherwise peels the seal from the container in order to dispense or gain access to its contents.

Initial attempts at sealing a container opening utilized an induction- or conduction-type inner seal covering the container's opening where the seal generally conformed to the shape of the opening such that a circular container opening was sealed with a round disk approximately the same size as the opening. These prior seals commonly had a lower heat activated sealing layer to secure a periphery of the seal to a rim or other upper surface surrounding the container's opening. Upon exposing the seal to heat, the lower layer bonded to the container's rim. In many cases, these seals included a foil layer capable of forming induction heat to activate the lower heat seal layer. These prior seals tended to provide good sealing, but were often difficult for a consumer to remove because there was nothing for the consumer to grab onto in order to remove the seal. Often, the consumer needed to pick at the seal's edge with a fingernail because there was little or no seal material to grasp.

Other types of seals for containers include a side tab or other flange that extended outwardly from a peripheral edge of the seal. These side tabs are generally not secured to the container rim and provide a grasping surface for a consumer to hold and peel off the seal. These side tabs, however, extend over the side of the container rim and often protrude into a threaded portion of the closure. If the side tab is too large, this configuration may negatively affect the ability of the seal to form a good heat seal. The side tabs (and often the seal itself) can be deformed or wrinkled when the closure or other cap is placed on the container due to contact between the closure (and threads thereof) and tabbed part of the seal. To minimize these concerns, the side tabs are often very small; thus, providing little surface area or material for a consumer to grasp in order to remove the seal.

Yet other types of seals include a sealing member having a tab defined on the top of the seal. One approach of these prior seals includes a partial layer of coated pressure sensitive adhesive to secure the tab to a layer of metal foil. The tab was formed by a full layer extending across the entire surface of the sealing member, but the full layer was only bonded to half of the seal to form the tab. This type of top-tabbed seal offered the advantage of a larger tab, which provided more grasping area for the consumer to hold and peel off the seal, but required a full additional layer of material in order to form the tab. In other approaches, the seal may include a tab formed from the additional full layer of film combined with an additional full layer of adhesive utilizing a part paper or part polymer layer, called a tab stock, to form the tab. This part layer is inserted between the additional full layer of adhesive and lower seal portions to prevent the tab from sticking to the layers below, which formed the tab.

However, even in these tabbed forms, the tab may still be difficult for a user to grasp to remove the seal. For example, the tab itself may be slippery, thin, and/or not provide appropriate surface area for a user to maintain sufficient grip. This is especially problematic when all of these issues combine, such as in the case of a small container and/or tab along with a tab including materials with lower coefficients of friction. If a user cannot quickly and safely remove the tab, but instead must use some other means of removing the seal, the main function of the tab is lost.

SUMMARY OF THE INVENTION

Various enhancements of tabbed seals are provided herein with enhanced grasping functionality. The below described embodiments may be used separately or may be used with two or more of the enhancements in combination with one another.

In one form, the tabbed seal includes an anti-slip coating that is positioned on at least one of a top and a bottom surface of the gripping tab. Previously, some tabs included release coatings to prevent the tab from adhering to the lower laminate and preventing the user from grasping the seal. An anti-slip coating may be applied to at least a portion of the gripping tab to enhance a user's ability to grasp and maintain a hold of the gripping tab.

In a similar form, the gripping tab may include a polymer adhesive layer on at least a portion of at least one of an upper and a lower surface of the gripping tab. The polymer adhesive layer may provide a tackier gripping surface so that the gripping tab is less slippery. However, the polymer adhesive layer should also be configured such that it does not prevent the gripping tab from releasing from the lower laminate portion.

According to one form, a tabbed sealing member for sealing to a rim surrounding a container opening is provided. The sealing member includes a multi-layer laminate having an upper laminate portion partially bonded to a lower laminate portion forming a gripping tab defined wholly within a perimeter of the sealing member. The gripping tab is configured for removing the sealing member from the container opening. The lower laminate portion is positioned below the gripping tab and including at least a sealant layer for bonding to the container rim. The upper laminate portion includes a support layer, a tab layer, and a grip enhancing layer. The upper laminate has a tab portion at least partly including the tab layer, the tab portion having an upper surface and a lower surface. The grip enhancing layer is positioned on at least one of the upper surface and lower surface and having a static coefficient of friction of at least about 0.4.

In yet another form, the gripping tab may be enhanced by including embossing and/or texturizing. This type of enhancement can be positioned on at least one of an upper and a lower surface of the gripping tab. In yet another portion, this type on enhancement may be configured to extend entirely through the gripping tab from the upper surface to the lower surface. For example, the gripping tab may be embossed in a process such that the entire structure of the gripping tab includes a texture.

In accordance with one form, a tabbed sealing member for sealing to a rim surrounding a container opening is provided. The sealing member includes a multi-layer laminate having an upper laminate portion partially bonded to a lower laminate portion forming a gripping tab defined wholly within a perimeter of the sealing member. The gripping tab is configured for removing the sealing member from the container opening. The lower laminate portion is positioned below the gripping tab and including at least a sealant layer for bonding to the container rim. The upper laminate portion includes a plurality of layers, one of the layers being an embossed layer and one of the layers being a non-embossed layer. The embossed layer imparts a texture to the non-embossed layer when combined to form the upper laminate portion.

According to one form, the gripping tab includes a thickening layer at an outer edge of the gripping tab. In this form, the thickened portions function similar to a stop, helping to prevent a user's fingers from sliding off of the tab.

In one form, a tabbed sealing member for sealing to a rim surrounding a container opening is provided. The sealing member includes a multi-layer laminate having an upper laminate portion partially bonded to a lower laminate portion forming a gripping tab defined wholly within a perimeter of the sealing member. The gripping tab is configured for removing the sealing member from the container opening. The lower laminate portion is positioned below the gripping tab and including at least a sealant layer for bonding to the container rim. The upper laminate portion includes a support layer, a tab layer, and a thickening layer. The thickening layer is a partial layer positioned at an outer edge of the upper laminate to provide a thickened portion relative to a thinner inward portion of the upper laminate.

These and other aspects may be understood more readily from the following description and the appended drawings.

BRIEF DESCRIPTION OF THE DRAWINGS

FIG. 8 is an exploded view of another form of tabbed seal having a thickened portion of the tab; and FIG. 9 is a perspective view of one form of assembling a laminate used to form a tabbed sealing member.

DETAILED DESCRIPTION

Figure 1:
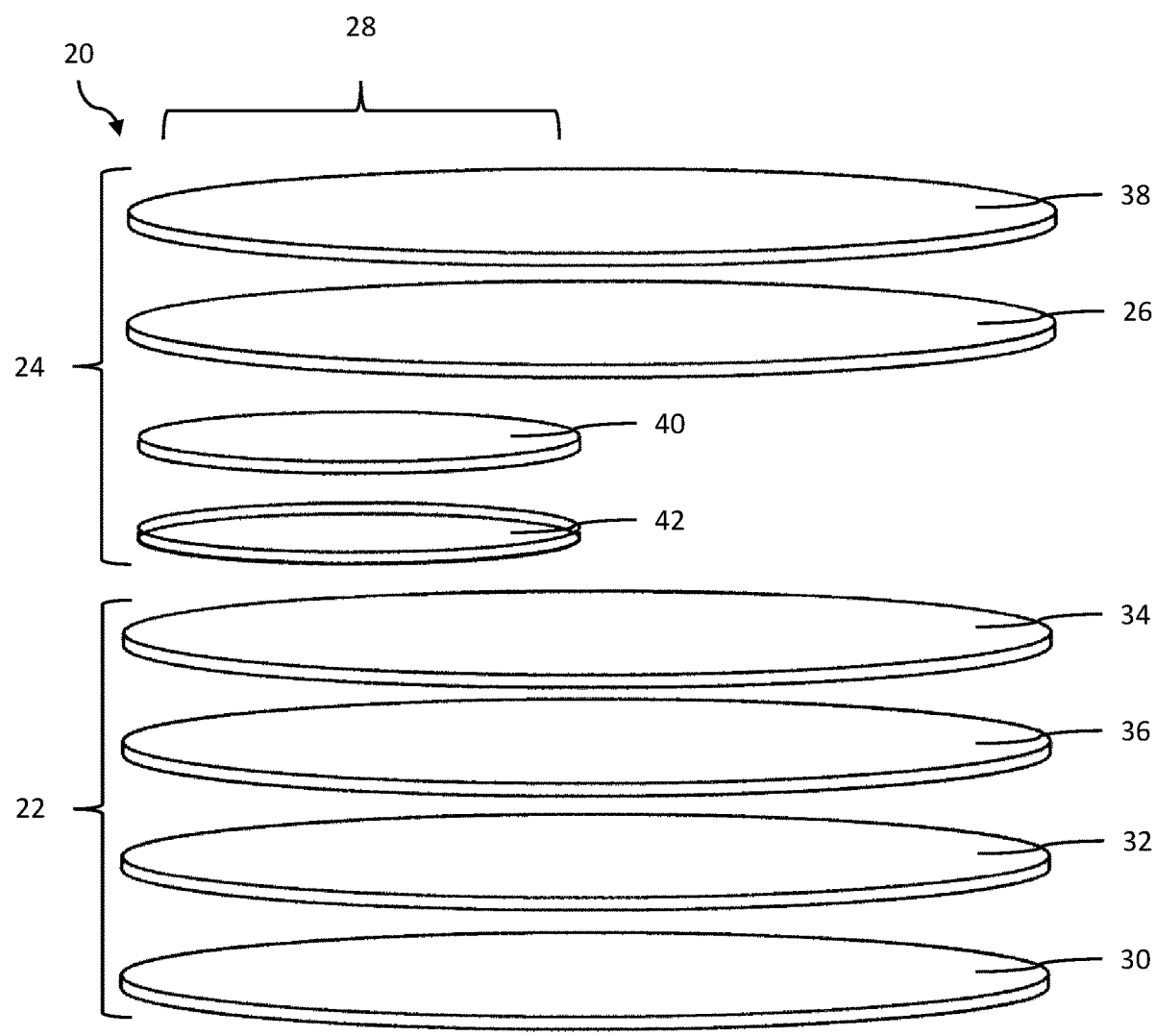
FIG. 1 is an exploded view of a tabbed seal having a grip enhancing layer on an underside of the tab.

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

A pull tab sealing member for a container is described herein containing an upper laminate portion having a pull tab bonded to a lower laminate portion capable of being heat sealed to a container's mouth or opening. In other forms, the sealing member may be sealed via a pressure sensitive sealant layer.

For simplicity, this disclosure generally may refer to a container or bottle, but the sealing members herein may be applied to any type of container, bottle, package or other apparatus having a rim or mouth surrounding an access opening to an internal cavity. In this disclosure, reference to upper and lower surfaces and layers of the components of the sealing member refers to an orientation of the components as generally depicted in figures and when the sealing member is in use with a container in an upright position and having an opening at the top of the container. Different approaches to the sealing member will first be generally described, and then more specifics of the various constructions and materials will be explained thereafter. It will be appreciated that the sealing members described herein, in some cases, function in both a one-piece or two-piece sealing member configuration. A one-piece sealing member generally includes just the sealing member bonded to a container rim. A cap or closure may be also used therewith. A two-piece sealing member includes the sealing member temporarily bonded to a liner. In this construction, the sealing member is bonded to a container's rim, and the liner is configured to separate from the sealing member during heating to be retained in a cap or other closure used on the container. In a two-piece construction, a wax layer, for example, may be used to temporarily bond the sealing member to a liner. Other types of releasable layers may also be used to provide a temporary bond between the seal and liner, but the releasable layers are generally heat activated.

As discussed above, tabbed seals can suffer from problems associated with a user's ability to properly grasp the tab. Tabbed sealing members have been modified as described herein to improve functionality beyond the current product lines offered. The feel or gripability of the tab is important. Some seals are designed such that the tab now includes one or more outer plastic surfaces which can be slippery to the touch especially in wet environments as refrigerated products can accumulate condensation, or simply from cooking and washing hands causing interaction with the tab to be slippery. This can be exacerbated by the use of release coatings or specialty plastic films that promote release from the foil or high density polyethylene (HDPE) film layers below the tab. With this knowledge it is important to design tab features that reduce slippage on the tab.

Anti-Slip Coatings and Polymer Adhesives

Referring to FIG. 1, a tabbed sealing member 20 is shown. The sealing member includes a lower laminate portion 22 and an upper laminate portion 24. The lower and upper laminate portions 22,24 are partially bonded together via an adhesive layer 26 to form a gripping tab portion 28. As found in FIG. 1, the adhesive layer 26 is provided in the upper laminate 24. It should be appreciated that the adhesive layer may also or alternatively be provided in the lower laminate portion 22.

The lower laminate portion 22 generally includes a sealant layer 30 for bonding to a rim of a container (not shown). The lower laminate portion 22 may also include additional layers. The lower laminate portion 22 may include one or more support and/or insulating layers. For example, the lower laminate portion 22 may include a support layer 32 and an insulating layer 34. It should be appreciated that one or neither of these layers may be included. Further, the relative location of the layers may also be changed, such as by switching the location of the layers. The lower laminate portion 22 may also include a membrane layer 36, such as a foil layer. The membrane layer 36 may be configured to provide barrier properties, such as against air and/or moisture. Further, the membrane layer 36 may be configured to provide inductive heating to heat one or more layers in the sealing member 20, such as sealant layer 30. It should be appreciated that other layers may also be included, such as additional support layers, insulating layers, adhesive layers, and the like.

The upper laminate portion 24 includes a variety of layers, such as a support layer 38, a tab layer 40, and a grip enhancing layer 42. The support layer 38 may be made from a variety of materials, such as polyethylene terephthalate (PET) and other layers described below. The tab layer 40 may also be made from similar materials.

The grip enhancing layer 42 may include materials such as an anti-slip coating and/or polymer adhesive. In one form, a polymer adhesive layer is applied to the lower surface of the tab layer 38. The anti-slip coatings and polymer adhesives can include a variety of materials including, but not limited to materials having increased coefficients of friction, such as rubber or rubberized materials and the like. The anti-slip coatings and polymer adhesives may also include a combination of materials.

The polymer adhesive layer may be the same polymer adhesive as the adhesive layer 38 used to adhere the upper laminate portion 24 to the lower laminate portion 22. The polymer adhesives can also include thermoplastic materials such as copolymers of polyethylene containing ethyl vinyl acetate that are extrusion coatings. Further, such materials include, but are not limited to, EVA and other modified co-polymers that are tackier or more grippable than release coatings and therefore a structure made in this manner leaves the underside of the tab less slippery.

Additional materials can be used for anti-slip coatings and polymer adhesives for enhancing grip on a tab. For example, such coatings and adhesives include materials that have a coefficient of static friction of at least about 0.4, at least about 0.45, at least about 0.50, at least about 0.6, etc. For instance, silicone release coatings with anti-slip properties can be used. The coefficient of friction can be controlled in silicone coatings by adding slip control additives such as a silicone elastomer and the like. Anti-slip control additives can also be used in combination with the polymer adhesives. Further, packaging over print varnishes such as nitrocellulose based lacquers can be used having a static coefficient of friction of at least about 0.4. Other over print varnishes and coatings may be used and include both solvent based and water based materials. Many coating and lacquers are available in the flexible packaging industry may also be suitable. These coatings may also include silica additives.

It should be appreciated that the grip enhancing layer 42 should be configured such that the tab portion 28 of the upper laminate portion 24 releases from the lower laminate portion 22. In this regard, the tab portion 28 is free from the lower laminate portion 22 or otherwise is easily released therefrom as a user lifts on the tab portion 28.

The anti-slip coating and polymer adhesives may also be used in a variety of thicknesses, as desired, and in view of the number and thicknesses of other coatings used in the seal. For example, in one form the coating has a thickness of about 0.03 to about 0.07 mil. and a coating weight of about 0.5 to about 4.0 g/m². Other Coating weights may also be used such as about 0.5 to about 1.6 g/m². In some forms, the coating has a thickness of about 0.05 mil.

The coatings can be used on an exterior surface of a variety of support materials. In one form, the coatings can be applied to a polymer film, such as polyethylene terephthalate (PET). The thickness of the support materials may also vary. For example, 48-92 GA. PET films can be used.

The use of anti-slip coatings and polymer adhesives, such as on the underside of the tab in Lift N Peel™ or Top Tab™, can provide a grippable surface. However, it should be appreciated that the anti-slip coatings and polymer adhesives can be used on one or more of the upper and lower surfaces of the gripping tab or portions thereof.

In other forms, the polymer adhesive layer on the underside of the tab stock (shown as Lift N Peel™) may be a different polymer adhesive than the polymer adhesive used to bond the PET layer to the lower laminate. In this form, the polymer adhesive used on the underside of the tab stock may have a lower bonding strength so that the tab stock may be separated from the lower laminate and thereby permit the gripping tab to be used.

While the embodiment shown in FIG. 1 includes specific layers and configuration of layers, it should be appreciated that anti-slip coatings may be used with a variety of different layers and configurations of layers. For example, the tabbed seal does not need to include the PET film layer in the lower laminate, as well as other layers.

Figure 2:
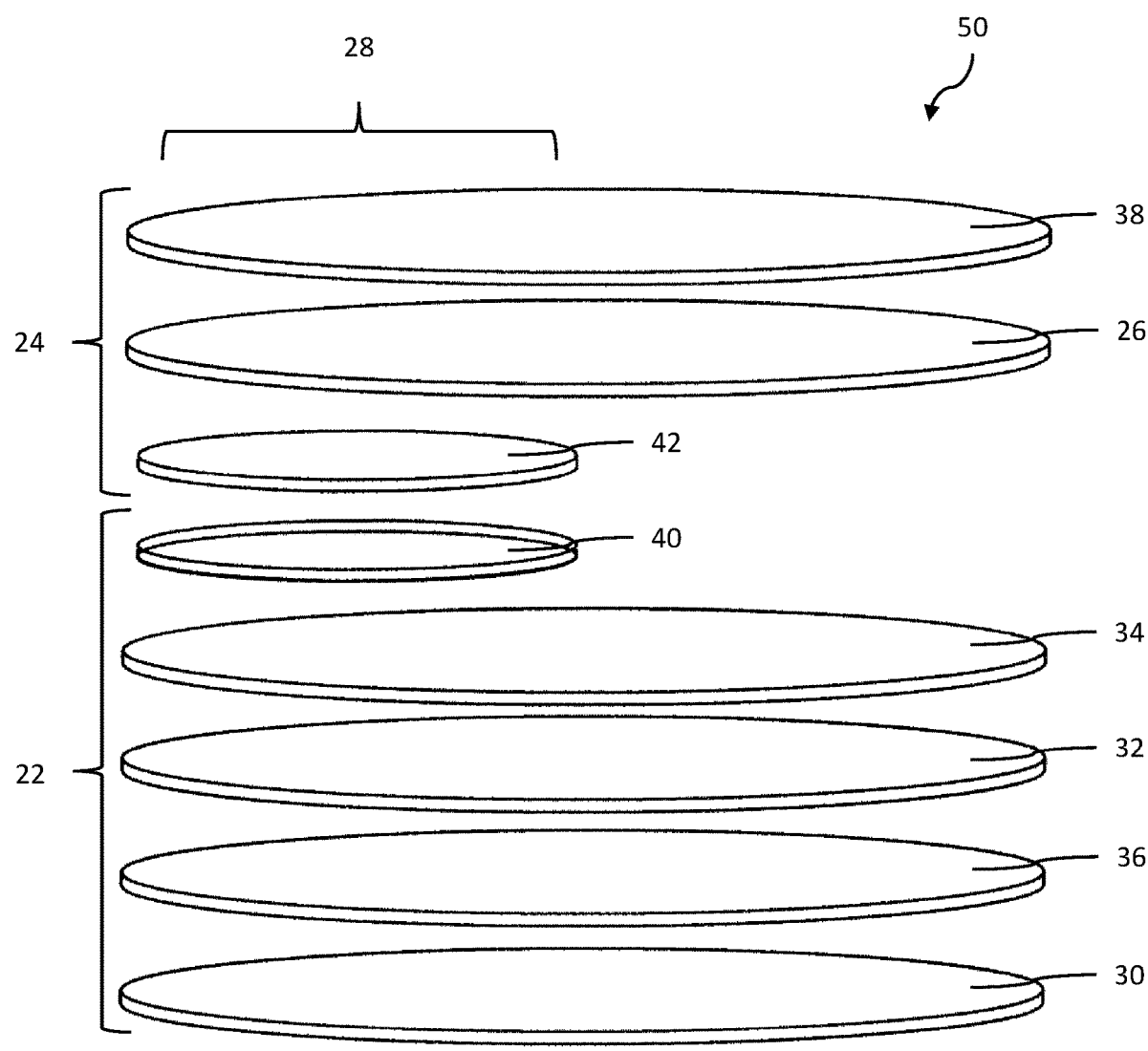
FIG. 2 is an exploded view of a tabbed seal having a grip enhancing layer on an underside of the tab.

FIG. 2 illustrates one form of sealing member having similar features as those found in FIG. 1. Therefore, the similar features and layers will not be discussed in detail and will be given similar reference numbers. More specifically, sealing member 50 in FIG. 2 is similar to FIG. 1 except for the location of the certain layers in the lower and upper laminate portions 22,24.

For example, the tab layer 40 has been relocated to the lower laminate portion 22. In this form, the tab layer 40 can include a release coating, such as a silicon coating, to help prevent the grip enhancing layer 42 from adhering. Further, in FIG. 2, the location of the various layers has been modified such that the membrane layer 36 is positioned adjacent the sealant layer 30. It should be appreciated that further modifications may also be done, such as including additional layers and/or moving the position of the layers.

Texturizing and Embossing

The surface characteristics of the certain layers, such as insulating layers (foam or non-foam), of tabbed inner seals can be important to functionality. Monolayer foams in particular impart "cavitated" or "cratered" surface characteristic or a roughness which is used to improve liner performance. This improvement is primarily due to the reduction in surface contact of the layer which is in direct contact with the inside of a closure. When a closure is removed, such as by rotating, the cavitated surface of the foam will reduce the associated removal force.

However, co-extruded foams or tri-layer foamed polymeric films tend to mask the roughness of surface "cratering" with the skin layers inherent in their design resulting in smoother materials which lessen the ability to reduce surface interaction. Similarly, closures which contain a reseal component, commonly foamed HDPE or PP co-polymers or faced foams will interact or "back bond" to the top side of an induction liner. This can be particularly problematic.

Moreover, since foaming of HDPE or blends of HDPE tend to produce inconsistent surfaces, the characteristics cannot be controlled within the limits needed, in some cases resulting in the need to use thicker insulating layers or alter the inner surface characteristics of the closure to lessen the interaction with the induction lining material. In addition, the free tab portion of a tabbed inner seal requires release technology. As noted above, a silicone release coating can be applied to the underside of the tab component in order to prevent the tab from adhering to the insulating layer.

The present concept produces a tabbed induction liner that provides a uniform surface characteristic which eliminates the inconsistent surface roughness of foam used in prior seals.

Figure 3:
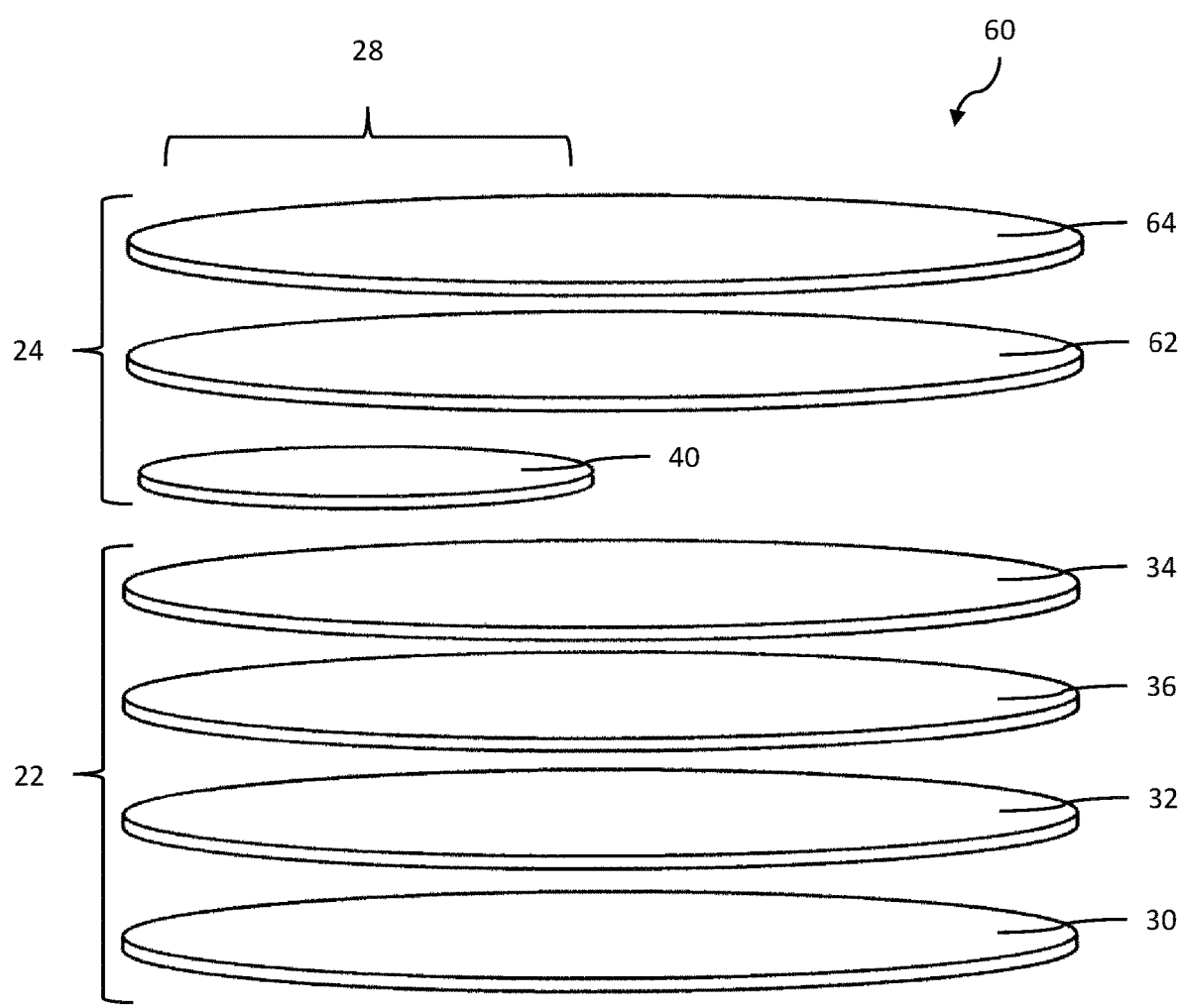
FIG. 3 is an exploded view of a tabbed seal having an embossed layer.

FIG. 3 illustrates a further tabbed sealing member utilizing texturizing and/or embossing to enhance a user's grasp of the tab. This embodiment includes many similar features and layers as described above such that the same reference numbers will be used.

Sealing member 60 is shown in FIG. 3 whereby at least a part of the tab portion 28 includes an outer surface having an embossed and/or texturized surface. More specifically, the upper laminate portion 24 includes an embossed layer 62 and a non-embossed layer 64. The embossed layer 62 can take a variety of forms, such as a polymer foam layer and/or a non-foam, polymer film layer. The embossed layer 62 is a layer which is embossed prior to incorporation into the upper laminate portion 24 and/or prior to the assembly of all layers in the upper laminate portion 24. The non-embossed layer 64 is a layer that has not been embossed, but otherwise takes on a texture when being assembled into the upper laminate portion 24 with the embossed layer 62.

In one form, the embossed layer 62 is a polymer foam layer that has been embossed with a regular, repeating pattern to provide a known surface area. The embossed pattern can then impart a texture on the non-embossed layer 64, which can be a polymer film layer. It should be appreciated that these two layers may be reversed such that the film may be the embossed layer and the foam is the non-embossed layer. Further, it should be appreciated that the embossed layer 62 may be an intermediate layer surrounded by at least one layer or partial layer such that the embossed layer imparts a texture onto at least one of the layers. Further, such materials include, but are not limited to, various blends of high density polyethylene and low density polyethylene resins.

Figure 4:
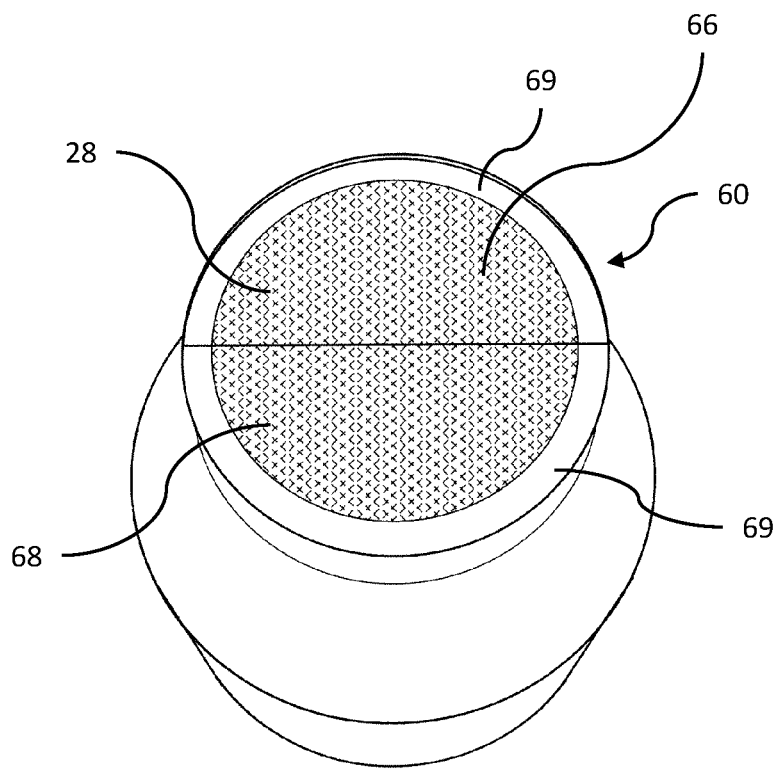
FIG. 4 is a perspective view of a tabbed seal having an embossed or textured tab.

The resulting texture may be a regular, repeating pattern that provides for desired friction and release properties. One exemplary form is shown in FIG. 4. As seen in FIG. 4, a repeating pattern 66 is shown in a top surface of the tab portion 28 and non-tab portion 68. Further, as shown in FIG. 4, there is no visible texture or pattern on the land area 69 above the container rim. This can be a result of the closure (not shown) being installed, thereby crushing the embossed portion. However, it should be appreciated that depending on the embossed pattern, the specific embossed and non-embossed layers, as well as other factors such as fastening force, the entirety of the upper surface of the sealing member 70 may provide for the embossed pattern.

Figure 5:
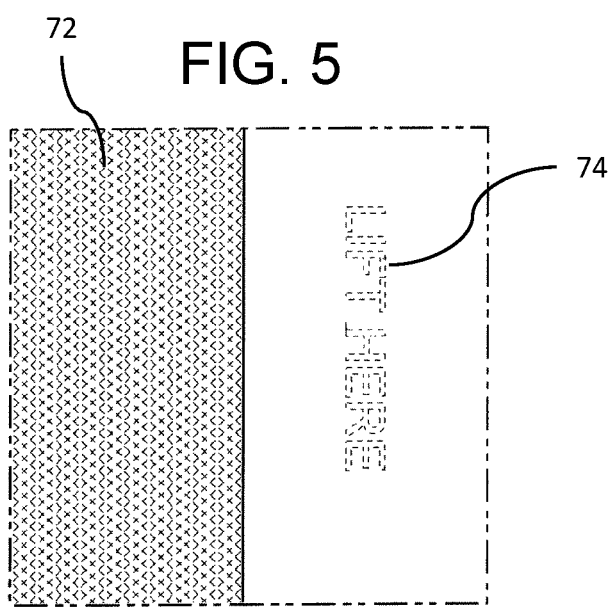
FIG. 5 is an enlarged view of a tabbed seal having an embossed or textured tab.

FIG. 5 illustrates yet another form of embossed pattern that includes regular dots and protrusions 72 as well as an embossed word 74. These embossed features may be used in combination on the same portions of the layers or on different portions, such as shown in FIG. 5.

In general, it should be appreciated that at least a portion of the tab is texturized and/or embossed. Texturization or embossing of one or more layers in the upper laminate, such as the insulating layer, imparts a textured surface to the liner. Depending on the depth and geometry of the embossed pattern various degrees of grip enhancement can be imparted. The depth and geometry of the pattern can be varied, as desired. The depth may also be varied depending on the overall desired thickness of the seal, the thickness of the layers in the tab, the grip of the tab, and the like.

In one form, diamond shaped embossing can be used. In other forms, dots or similar structures can be embossed into one or more layers. For example, approximately 250-400 dots per inch can be embossed into the one or more layers. Similarly, other repeating patterns or symbols can be embossed. For example, in one form, a repeating logo or design can be embossed. Many repeating patterns may be used as long as they do not significantly diminish (such as to the point of failure) the adhesion of the substrate to the layer that is being laminated to the embossed layer.

According to one form, the embossing, such as dots, logos, etc., can be applied such that 25-75% of the surface area of the surface has been embossed. In other forms, just the tab portion may be embossed.

As noted above, one or more of polymer layers can be embossed or otherwise be provided with a surface roughness. By embossing the polymer layer(s), the non-smooth resulting surface may help impart desired roll release properties to the laminate and help minimize blocking when it is unwound prior to cutting into individual seals. Further, the grain or surface roughness, in some approaches, tends to reduce the surface contact between the outer layer and any liner or cap applied over the sealing member. This grain or surface roughness tends to result in a reduction in removal force of a cap or adjacent liner (in a two-piece seal) in view of the decreased surface contact between the outer layer and any adjacent surface cap or liner surface. Therefore, the embossed surface cannot only enhance the user's ability to grasp the tab, but may also enhance other production processes, as described above.

It should be understood that by embossing, the overall thickness of the embossed material may be increased. For example, a 70% high density polyethylene film was embossed with a stippled pattern at 324 dots per inch. The standard film was approximately 2.5 mil. prior to embossing and was approximately 3.47 mil. after embossing.

Further, when using embossing techniques, a thinner starting material may be used than typically required as the embossing procedure increases the thickness, which can also increase the insulating properties of the material.

Just as with the other embodiments described herein, the embossed features can be used with a variety of layers and combinations thereof, when used in a tabbed seal. These features include, but are not limited to, the other grip enhancing features described herein.

Increasing Thickness of Portion(s) of the Tab

Figure 6:
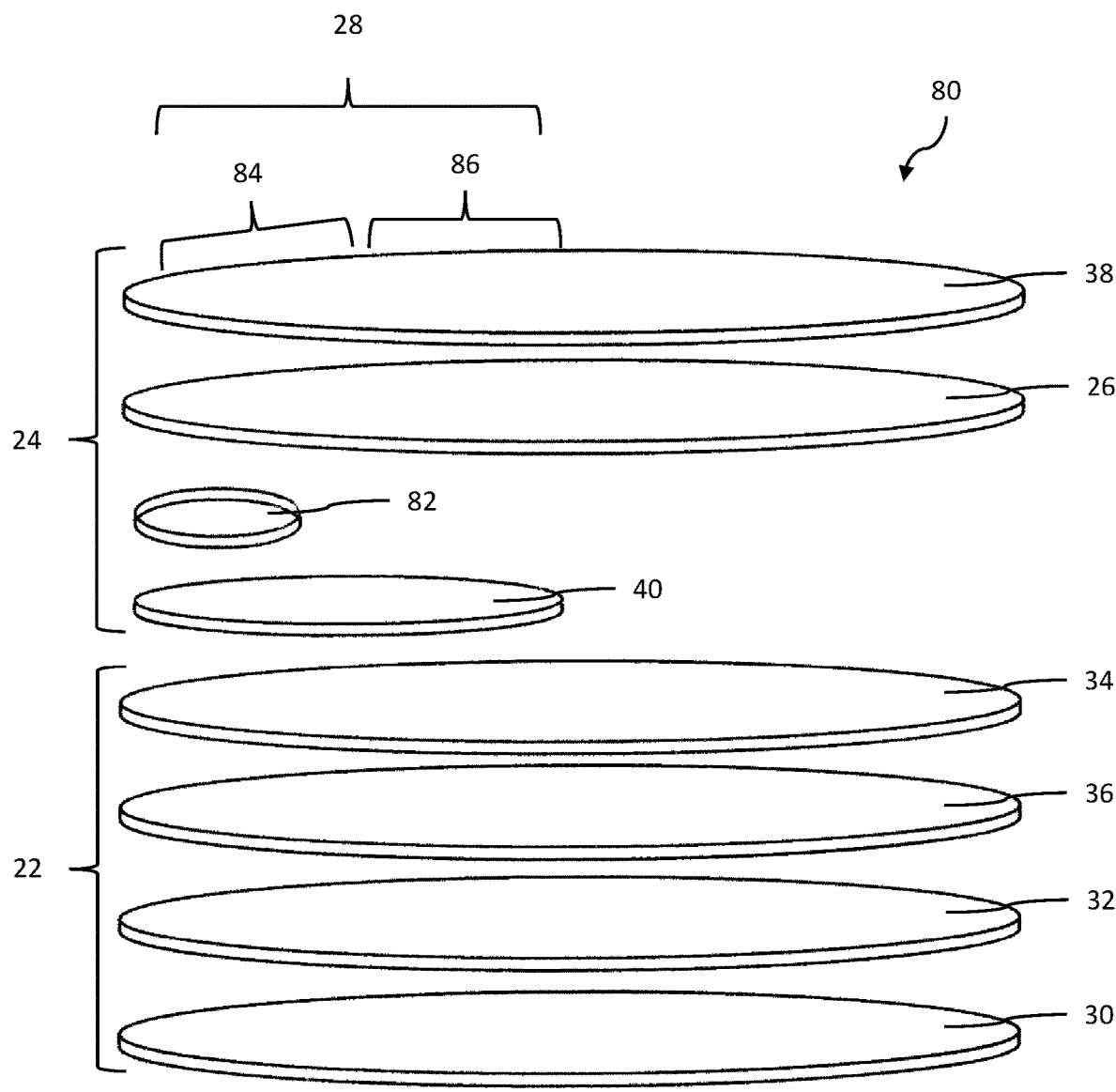
FIG. 6 is an exploded view showing one form of a tabbed seal having a thickened portion of the tab.
Figure 7:
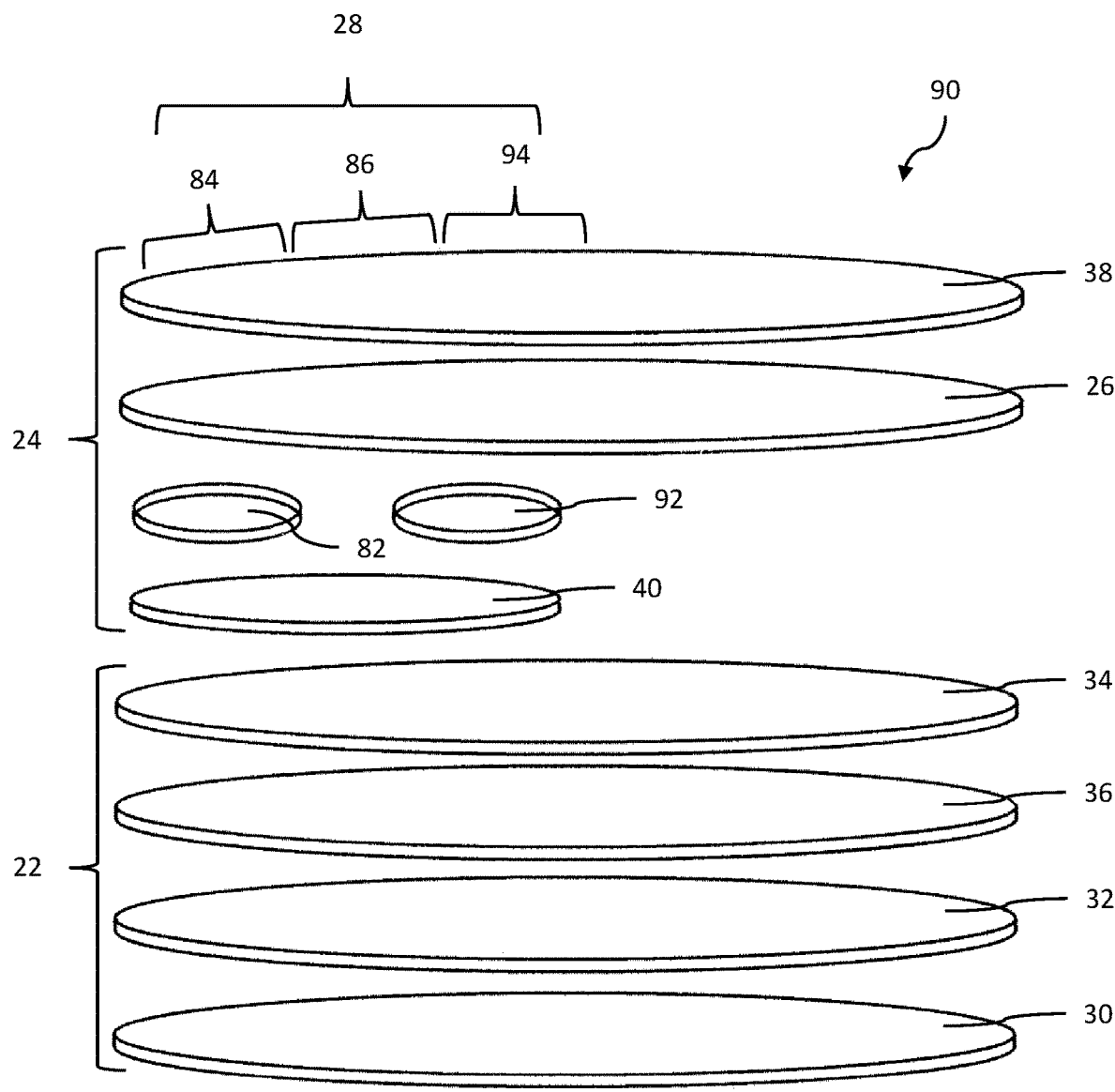
FIG. 7 is an exploded view of one form of tabbed seal having multiple thickened portions of the tab.

Additional grip enhancing embodiments are shown in FIGS. 6-8. In these forms, a much thicker portion of the tab is provided to help a user grasp the gripping tab. Adding a much thicker component to the end of the tab may provide the consumer with a physical stop to aid in gripping and removing the liner system. The embodiments shown in FIGS. 6-8 include many similar features and layers as found in FIG. 1 such that they need not be described in detail here and are given the same reference numbers.

Referring to FIG. 6, a sealing member 80 is shown whereby a thickening layer 82 is provided as part of the upper laminate portion 24. In this form, the thickening layer 82 is positioned between the tab layer 40 and the support layer 38. Further, the thickening layer 82 is positioned towards an outer edge 84 of the tab portion 28. As the thickening layer 82 is only a partial layer, a thinner inward portion 86 results on the tab portion 28. This can provide a user with a stop towards the outer edge 84 and enhance grip on the tab portion 28.

FIG. 7 illustrates a form that includes multiple thickening layers. More specifically, the upper laminate portion 24 of sealing member 90 includes the thickening portion 82 at an outer edge 84 as well as thickening portion 92 at an innermost portion 94. The thinner portion 86 is positioned between the outer edge 84 and innermost portion 94.

FIG. 8 illustrates a form whereby the thickening layer has been moved in the upper laminate portion. More specifically, in sealing member 100, the thickening portion 82 has been positioned on an outer surface 102 of the tab layer 40.

The thickened portion can be positioned to be toward an outer edge, as in FIGS. 6-8, as well as an inner portion, as in FIG. 7. Further, the thick portion can be positioned above and/or below various layers in the upper laminate, such as seen in the comparison of FIGS. 6 and 8. It should be appreciated that the thickened portion can also be positioned between other layers in the upper laminate.

In one form, the thickened portion approximately doubles the thickness at the end of the tab. In other forms, the thickened portion results in an increase of at least about 25% of the thinner inward portion. In some forms, the increase is at least about 75% and in other forms, the increase is at least about 100% compared to the inward thinner portion of the tabbed portion. In yet other forms, the increase is at least about 150% and in other forms, at least 200% compared to the inward thinner portion of the tabbed portion.

The thickened portion can be made from a variety of different materials, including, but not limited to, the various materials for any of the layers described herein. Further, the thickness of the thickened material can vary as needed to provide the desired overall tab thickness.

The thickened portions may be made from a variety of materials including, but not limited to, foamed high density polyethylene, rigid polyethylene terephthalate, and the like.

The thickened portions can be applied in the final lamination step between the upper and lower laminate portions. Further, the thickened portions can be applied earlier in the process, such as during formation of the upper laminate portion.

The lower seal portion and upper seal portion may include a variety of different materials and layers. For instance, the lower seal portion may include a metal foil, and the top surface of the lower seal portion may be the metal foil. The lower seal portion may also include a foamed polymer, or the top surface of the lower seal portion may be a polymer film selected from polyolefin materials and polyester materials.

Sealing Members Generally

The sealing members herein may be formed from laminates whereby the laminates are slit and or cut into the final sealing members. FIG. 9 illustrates one form of assembling a laminate used to form a sealing member. In this form, the upper laminate portion 24 is joined with the lower laminate portion 22 with the tab layer 40 therebetween to form a laminate 130. The laminate 130 can then be slit and/or cut to form the individual sealing members. The individual sealing members can take a variety of shapes, such as disc shaped.

Additional layers may be included in the upper and/or lower laminate such as polyethylene terephthalate (PET), nylon, or other structural polymer layer and may be, in some approaches, about 0.5 to about 1 mil thick. In some approaches, additional layers may be included in the lower laminate. It should be appreciated that the lower seal laminate may include any number of other layers, such as polymer layers, adhesives, polymer films, polymer foams and the like.

The lower sealant or heat seal layer may be composed of any material suitable for bonding to the rim of a container, such as, but not limited to, induction, conduction, or direct bonding methods. Suitable adhesives, hot melt adhesives, or sealants for the heat sealable layer include, but are not limited to, polyesters, polyolefins, ethylene vinyl acetate, ethylene-acrylic acid copolymers, surlyn, and other suitable materials. By one approach, the heat sealable layer may be a single layer or a multi-layer structure of such materials about 0.2 to about 3 mils thick. By some approaches, the heat seal layer is selected to have a composition similar to and/or include the same polymer type as the composition of the container. For instance, if the container includes polyethylene, then the heat seal layer would also contain polyethylene. If the container includes polypropylene, then the heat seal layer would also contain polypropylene. Other similar materials combinations are also possible.

The polymer layers used in the upper and/or lower laminates may take a variety of forms such as coatings, films, foams, and the like. Suitable polymers include but are not limited to, polyethylene, polypropylene, ethylene-propylene copolymers, blends thereof as well as copolymers or blends with higher alpha-olefins. By one approach, one or more of the polymer layers may be a blend of polyolefin materials, such as a blend of one or more high density polyolefin components combined with one or more lower density polyolefin components. In one form, one polymer layer may be a polyethylene film while another polymer layer may be a PET film. According to one form, the polyethylene film may have a thickness of about 5 to about 20 microns while the PET film may have a thickness of about 5 to about 20 microns.

A support layer may be optional in the laminate. If included, it may be polyethylene terephthalate (PET), nylon, or other structural polymer layer and may be, in some approaches, about 0.5 to about 1 mil thick.

The membrane layer may be one or more layers configured to provide induction heating and/or barrier characteristics to the seal. A layer configured to provide induction heating is any layer capable of generating heat upon being exposed to an induction current where eddy currents in the layer generate heat. By one approach, the membrane layer may be a metal layer, such as, aluminum foil, tin, and the like. In other approaches, the membrane layer may be a polymer layer in combination with an induction heating layer. The membrane layer may also be or include an atmospheric barrier layer capable of retarding the migration of gases and moisture at least from outside to inside a sealed container and, in some cases, also provide induction heating at the same time. Thus, the membrane layer may be one or more layers configured to provide such functionalities. By one approach, the membrane layer is about 0.3 to about 2 mils of a metal foil, such as aluminum foil, which is capable of providing induction heating and to function as an atmospheric barrier.

In some forms, the seals may include an insulation layer or a heat-redistribution layer. In one form, the insulation layer may be a foamed polymer layer. Suitable foamed polymers include foamed polyolefin, foamed polypropylene, foamed polyethylene, and polyester foams. In some forms, these foams generally have an internal rupture strength of about 2000 to about 3500 g/in. In some approaches, the foamed polymer layer 106 may also have a density less than 0.6 g/cc and, in some cases, about 0.4 to less than about 0.6 g/cc. In other approaches, the density may be from about 0.4 g/cc to about 0.9 g/cc. The foamed polymer layer may be about 1 to about 5 mils thick.

In other approaches, a non-foam heat distributing or heat re-distributing layer may be included. In such approach, the non-foam heat distributing film layer is a blend of polyolefin materials, such as a blend of one or more high density polyolefin components combined with one or more lower density polyolefin components. Suitable polymers include but are not limited to, polyethylene, polypropylene, ethylene-propylene copolymers, blends thereof as well as copolymers or blends with higher alpha-olefins. By one approach, the non-foam heat distributing polyolefin film layer is a blend of about 50 to about 70 percent of one or more high density polyolefin materials with the remainder being one or more lower density polyolefin materials. The blend is selected to achieve effective densities to provide both heat sealing to the container as well as separation of the liner from the seal in one piece.

The heat-activated bonding layer may include any polymer materials that are heat activated or heated to achieve its bonding characteristics or application to the seal. By one approach, the heat-activated bonding layer may have a density of about 0.9 to about 1.0 g/cc and a peak melting point of about 145° F. to about 155° F. A melt index of the bonding layer 120 may be about 20 to about 30 g/10 min. (ASTM D1238). Suitable examples include ethylene vinyl acetate (EVA), polyolefin, 2-component polyurethane, ethylene acrylic acid copolymers, curable two-part urethane adhesives, epoxy adhesives, ethylene methacrylate copolymers and the like bonding materials.

The adhesives useful for any of the adhesive or tie layers described herein include, for example, ethylene vinyl acetate (EVA), polyolefins, 2-component polyurethane, ethylene acrylic acid copolymers, curable two-part urethane adhesives, epoxy adhesives, ethylene methacrylate copolymers and the like bonding materials. Other suitable materials may include low density polyethylene, ethylene-acrylic acid copolymers, and ethylene methacrylate copolymers. By one approach, any optional adhesive layers may be a coated polyolefin adhesive layer. If needed, such adhesive layers may be a coating of about 0.2 to about a 0.5 mil (or less) adhesive, such as coated ethylene vinyl acetate (EVA), polyolefins, 2-component polyurethane, ethylene acrylic acid copolymers, curable two-part urethane adhesives, epoxy adhesives, ethylene methacrylate copolymers and the like bonding materials.

In one aspect, the tab may be formed by a full layer or partial layer of material combined with a partial width composite adhesive structure that includes a polyester core with upper and lower adhesives on opposite sides thereof. This partial composite adhesive structure bonds the upper laminate to the lower laminate to form the gripping tab.

In other aspects of this disclosure, the upper laminate of the seal does not extend the full width of the sealing member in order to define the gripping tab. To this end, the pull-tab sealing members herein may also combine the advantages of a tabbed sealing member with a large gripping tab defined completely within the perimeter of the seal, but achieve such functionality with less material (in view of the part layers of the upper laminate) and permit such a tab structure to be formed on many different types of pre-formed lower laminates. The partial upper laminate structure is advantageous, in some approaches, for use with a seal configured for large or wide mouth containers, such as containers with an opening from about 30 to about 100 mm (in other approaches, about 60 to about 100 mm). These seals may also be used with 38 mm or 83 mm container openings, or can be used with any sized container.

In further aspects of this disclosure, the sealing members herein may include a pull or grip tab defined in the upper laminate portion wholly within a perimeter or circumference of the sealing member wherein an upper surface of the sealing member is partially defined by the upper laminate portion and partially defined by the lower laminate portion. In one approach of this aspect, the top surface of the sealing member is provided by a minor portion of the upper laminate and a major portion of the lower laminate. In other approaches of this aspect, the lower laminate is partially exposed at a top surface of the seal with about 50 percent to about 75 percent (or more) of the lower laminate exposed at the top surface of the entire seal. The seals of this aspect allow consumers to remove the sealing member using the tab (as in a conventional pull-tab seal) and/or puncture the sealing member by piercing the exposed lower laminate portion to provide push/pull functionality depending on the preference of the consumer.

In the various embodiments, the seals of the present disclosure defining a tab wholly within a perimeter or circumference of the seal (formed by a full or partial layer) also provide an improved ability for the tabbed sealing member to function in a two-piece seal and liner combination. In a two-piece seal and liner combination, the tabbed sealing member is temporarily adhered across its top surface to a liner. After container opening and removal of a cap or closure, the sealing member stays adhered to the container mouth and the liner separates and remains in the container's cap.

In some prior versions of two-piece seal and linear assemblies, the bottom layer of the sealing member is a heat seal layer that is activated by heating, such as by induction or conduction heating, in order to adhere or bond an outer periphery of the sealing member to a rim surrounding the mouth of a container. In the two-piece seal and liner combination, an upper surface of the sealing member is temporarily adhered to a lower surface of the liner by a release layer, which is often a heat-activated release layer, such as an intervening wax layer. During heating to bond the sealing member to the container, heat not only activates the lower heat seal layer, but also travels upwardly through the seal to melt the intervening wax across the entire surface of the sealing member to separate the liner from the sealing member. Often, the melted wax is absorbed by the liner in order to permit easy liner separation from the sealing member. As can be appreciated, for this sealing member and liner combination to function properly, the intervening wax layer needs to be melted across the entire surface of the sealing member. If the wax is not melted evenly all the way across the sealing member upper surface, the liner may not properly separate from the lower seal portion.

The various layers of the sealing member are assembled via coating adhesives, applying films, and/or a heat lamination process forming a sheet of the described layers. Extrusion lamination may also be used. The resulting laminate sheet of the sealing members can be cut into appropriate sized disks or other shapes as needed to form a vessel closing assembly or tabbed sealing member. The cut sealing member is inserted into a cap or other closure which, in turn, is applied to the neck of a container to be sealed. The screw cap can be screwed onto the open neck of the container, thus sandwiching the sealing member between the open neck of the container and the top of the cap. The sealing layer may be a pressure sensitive adhesive, the force of attaching the closure to the container can activate the adhesive.

A further enhancement may be provided in combination with any of the above described features to allow for a greater surface area for the gripping tab than in previous forms. However, prior seals that have attempted to incorporate larger free tabs have encountered difficulties such as the tab moving during cap installation and/or sealing. In this regard, the tab can fold on itself, crease, or otherwise move. This can deform the tab, make sealing difficult, and/or make cap installation difficult.

To overcome these difficulties, a new tab has been configured such that the overall gripping tab is larger, but a portion thereof is temporarily adhered to the lower laminate, such as during seal and/or cap installation. Instead, the gripping tab includes a small free portion and then a second, temporarily bonded portion that can either release or rupture, permitting the overall grippable portion of the tab to be large. In some forms, the gripping tab portion may be at least 50% of the overall diameter or width of the seal. In other forms, the gripping tab portion may be larger, such as 70%, 80%, and 90% or more. The remaining portion of the upper laminate may be more permanently adhered to the lower laminate so that the seal may be removed from the container.

In one form, a small free tab is provided at an edge of the tab. This portion of the tab is generally free for the user to grasp. During removal, the consumer peels the tab upward thereby extending the tab to a larger dimension for use in removing the seal. In this form, this extra area is temporarily bonded via a release layer. This area can have an adhesive that releases from at least one of the layers, a material such as paper, that ruptures, or other similar function. A final area is generally considered a permanent bond as it should not release during seal removal and otherwise secures the tab to the seal during removal of the seal.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of Applicant's contribution. The actual scope of the protection sought is intended to be defined in the following claims when viewed in their proper perspective based on the prior art.

What is claimed is:

1. A tabbed sealing member for sealing to a rim surrounding a container opening, the sealing member comprising:
    a multi-layer laminate including an upper laminate portion partially bonded to a lower laminate portion forming a gripping tab defined wholly within a perimeter of the sealing member, the gripping tab for removing the sealing member from the container opening;
    the lower laminate portion positioned below the gripping tab and including at least a sealant layer for bonding to the container rim;
    the upper laminate portion including a plurality of layers, one of the layers being an embossed layer and one of the layers being a non-embossed layer, the embossed layer imparting a texture having a repeating pattern to just a gripping tab portion of the non-embossed layer when combined to form the upper laminate portion.

2. The tabbed sealing member of claim 1, wherein the embossed layer is at least one of a polymer foam layer and a non-foam polymer layer.

3. The tabbed sealing member of claim 1, wherein the embossed layer is an internal layer of the upper laminate and provides the repeating pattern of raised protrusions on an exposed external surface of the upper laminate.

4. The tabbed sealing member of claim 3, wherein the raised protrusions make up approximately 25-75% of the exposed external surface of the upper laminate.

5. A method of forming a tabbed sealing member for sealing to a rim surrounding a container opening, the method comprising:
    providing an embossed layer;
    providing a non-embossed layer;
    combining the embossed layer with the non-embossed layer to form an upper laminate portion, the embossed layer imparting a texture to just a gripping tab portion of the non-embossed layer such that at least one of an upper and a lower surface of the upper laminate portion has an increased texture compared to the non-embossed layer prior to combination with the embossed layer, the texture having a repeating pattern; and
    combining the upper laminate portion with a lower laminate portion to form the tabbed sealing layer whereby the upper laminate portion partially is bonded to the lower laminate portion forming a gripping tab defined wholly within a perimeter of the sealing member, the gripping tab for removing the sealing member from the container opening.

6. The method of claim 5, wherein the embossed layer is at least one of a polymer foam layer and a non-foam polymer layer.

7. The method of claim 5, wherein the embossed layer is an internal layer of the upper laminate and provides the repeating pattern of raised protrusions on an exposed portion of at least one of the upper and lower surfaces of the upper laminate.

8. The method of claim 7, wherein the raised protrusions make up approximately 25-75% of the exposed portion.

9. A tabbed sealing member for sealing to a rim surrounding a container opening, the sealing member comprising:
    a multi-layer laminate including an upper laminate portion partially bonded to a lower laminate portion forming a gripping tab defined wholly within a perimeter of the sealing member, the gripping tab for removing the sealing member from the container opening;
    the lower laminate portion positioned below the gripping tab and including at least a sealant layer for bonding to the container rim;
    the upper laminate portion including a support layer, a tab layer, and a thickening layer, the thickening layer being a partial layer positioned at an outer edge of the upper laminate to provide a thickened portion relative to a thinner inward portion of the upper laminate,
    wherein the thickening layer at least doubles the thickness of the outer edge of the upper laminate compared to an upper laminate that does not include the thickening layer.

10. The sealing member of claim 9, wherein the thickening layer is at least as thick as the thinner inward portion of the upper laminate.

11. The sealing member of claim 9, further comprising a second thickening layer positioned inwardly of the outer edge wherein the thinner inward portion is between the thickening layer and the second thickening layer.

12. The sealing member of claim 9, wherein the thickening layer is positioned between the support layer and the tab layer.

13. The sealing member of claim 9, wherein the thickening layer is positioned on an outer surface of the tab layer.

* * * * *